March 11, 1941.   T. J. MUENCH   2,234,903
FLOATING CANDLE
Filed Dec. 9, 1939
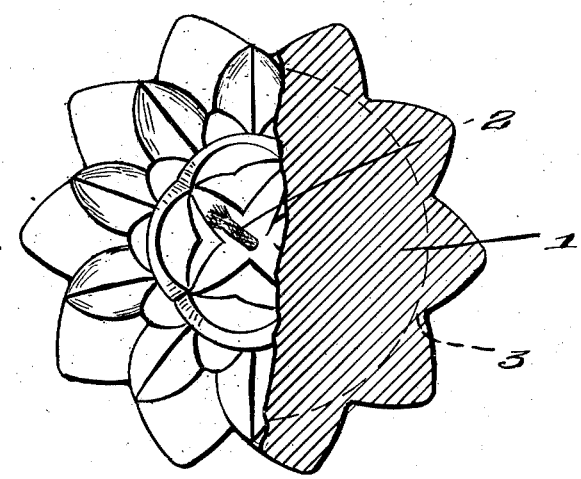
Fig. 1
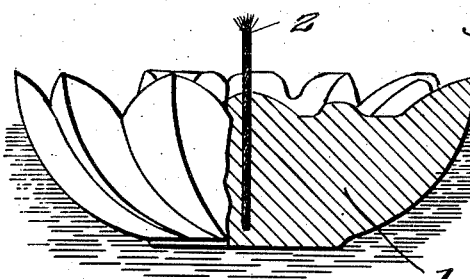
Fig. 2
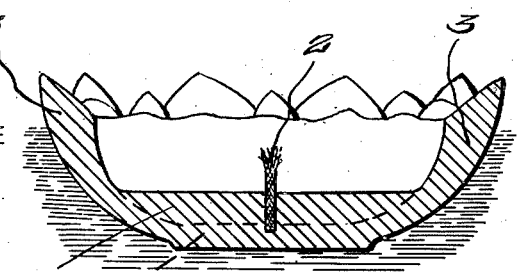
Fig. 3
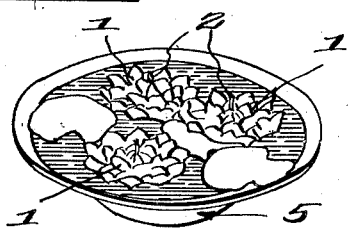
Fig. 4
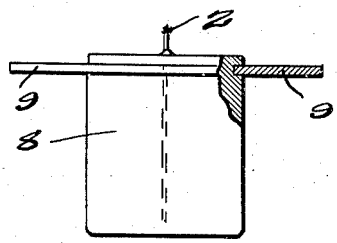
Fig. 6
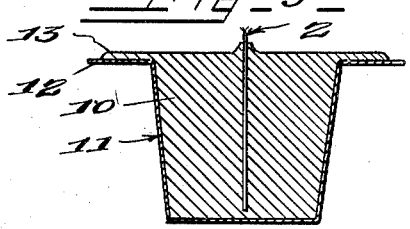
Fig. 5
Fig. 7
INVENTOR.
Thomas J. Muench
BY Biddle & Thompson
ATTORNEYS.

Patented Mar. 11, 1941

2,234,903

UNITED STATES PATENT OFFICE 2,234,903

FLOATING CANDLE

Thomas J. Muench, Syracuse, N. Y., assignor to Muench-Kreuzer Candle Co., Inc., Syracuse, N. Y., a corporation of New York Application December 9, 1939, Serial No. 308,441

4 Claims. (Cl. 67—22.5)

This invention relates to candles, and has for its object a candle so constructed that it will float with the wick or flame end upward or will not overturn initially or when the candle consumes, and also a candle that as it consumes forms a hollow shell-like vessel of the candle material, due to the contact of the water or liquid with the outer side surface and bottom end of the candle or the chilling or hardening effect of the water on the outer side surface and bottom end of the candle.

It further has for its object a candle, as a floating candle, provided with means or so shaped that it will remain in upright position when floating with its surface at or near the level of the water and will consume with a minimum of waste, the candle having the main body of wax or candle body in the line of gravitation and with the wick located in said line, so that the candle will be entirely consumed, except for a thin outer shell, the outer surface of which is in contact with the water.

The invention further has for its object an article embodying a floating candle which floats with practically only its upper end exposed.

The invention consists in the novel features and in the combinations and constructions hereinafter set forth and claimed.

In describing this invention, reference is had to the accompanying drawing in which like characters designate corresponding parts in all the views.

Figure 1 is a plan view, partly broken away, of a candle embodying this invention.

Figure 2 is a side elevation, partly in section.

Figure 3 is a view, similar to Figure 2, showing the candle as partly consumed.

Figure 4 is a perspective view of an article embodying floating candles.

Figures 5, 6 and 7 are views similar to Figure 2 of modified forms of the invention.

1 designates the candle, which is so constructed as to float in water, it being preferably of a wax, which itself is lighter than water, or will float in water, with the greater portion thereof below the surface of the water, the candle having a wick 2 centrally thereof, and the candle being wider at its upper end than at its lower end, so that from its shape alone, it tends to remain upright initially and as the candle consumes and take the form of a shell or vessel.

The candle is here shown as conoidal in form with the wick located at the axis of the conoidal formation, so that the greater portion of the wax is symmetrical with the wick in the line of gravitation. This results in the greater portion of the candle wax being consumed, leaving only a thin shell at 3 and at 4 at the bottom end of the candle. When the candle is entirely consumed, the water in contact with the sides and bottom of the candle or the chilling or hardening effect of the water on the sides and bottom of the candle causes the candle to take the shell formation, as it is consumed. Owing to the shape of the candle, that is, flaring toward its upper end, the candle initially floats and also, floats as it hollows out during the burning, and remains balanced, so that it does not tip over or ship water and also always remains with its upper end projecting above but nearly flush at the level of the surface of the water.

In Figure 4 is shown a complete article embodying a vessel 5 for receiving water, and one or more of the floating candles therein, the article providing a center-piece for a table, or for any other ornamental purpose.

Owing to the construction of the candle, the greater part of the body of wax will be consumed without destroying the balance of the candle in the water and also provide a symmetrical balanced shell or vessel, as the candle consumes.

In Figure 5 a modified form of the candle is shown in which the upper end of the candle is shown as provided with an annular flange or collar at 6 at the upper end of the cylindrical body 7 of the candle. This flange may be formed of candle material or wax.

In Figure 6, a candle body 8 is shown as provided with a collar 9 of a different material from that of the candle, as for instance, wood, Celluloid, Cellophane, etc.

Figure 7 shows a floatable candle in which the entire candle body 10 may be encased in a thin protective shell 11 of suitable material as Cellophane flaring outwardly at 12 at its upper end. The candle material may overlie the upper surface of the flange 12, as at 13.

In any form of the invention, the candle is so shaped that it floats with its top surface slightly above the surface of the water with the main body of the candle, which is consumable, located concentric with the line of gravitation, that is, the line passing through the center of gravity of the candle, with the wick also located in the line of gravitation, so that the candle consumes to a maximum extent and remains in its initial position or does not become unbalanced and overturned or in any form of the invention the candle is composed entirely of consumable material and has a horizontal dimension sufficiently greater than its vertical dimension to enable the candle to float unsupported in a stable upright position on the surface of water in an open receptacle (in contradistinction to on the surface of water in a receptacle in which the walls of the receptacle guide or support the floating body in a lateral direction) and a wick arranged in vertical position at the center or axis of flotation of the candle body, all so that the body of the candle in burning hollows out into a thin shell of consumable material which protects the flame of the candle from water and which is floatable in the water of an open receptacle, that is, an open body of water, in an upright stable position without danger of tipping or of shipping water.

What I claim is:

1. A floating candle having an annular flange around its upper end, whereby the candle floats with its top surface initially nearly flush with the surface of the water with the wick located in the line of gravitation of the body of the candle, and the body of the candle concentric with said line, whereby the greater part of the body of the candle consumes, leaving a thin shell forming a vessel for the consuming portion of the candle body.

2. A floating candle having an annular flange around its upper end, whereby the candle floats with its top surface initially nearly flush with the surface of the water with the wick located in the line of gravitation of the body of the candle, and the body of the candle concentric with said line, whereby the greater part of the body of the candle consumes, leaving a thin shell forming a vessel for the consuming portion of the candle body, said annular flange being an integral part of and the same material as the candle body.

3. A floating candle including a candle body composed entirely of consumable material having a horizontal dimension sufficiently greater than its vertical dimension to enable the candle to float unsupported in a stable upright position at the surface of an open body of water, and a wick arranged in a vertical position at the center of flotation of the candle body, the horizontal diameter of the candle body being sufficient to cause the candle in burning to hollow out of the candle body a thin shell composed entirely of the consumable material of the body and adapted to protect the flame of the candle from water and floatable in said open body of water in an upright stable position without support and without danger of tipping or shipping water whereby a separate float or extraneous container for the candle is rendered unnecessary.

4. A floating candle consisting solely of a solid candle body composed entirely of consumable material having an exterior bowl-shaped configuration and having a diameter greater than its vertical dimension and floatable in a stable upright unsupported position in an open body of water slightly above the surface thereof without danger of tipping or shipping water, and a wick arranged in a vertical position at the axis of the candle body, the candle in burning being maintained in said stable upright position and the horizontal diameter of the body being sufficiently great to cause the flame of the candle in burning to hollow out the body of consumable material and leave a relatively thin hollow shell constituting a floatable receptacle protecting the flame and surrounding the wick and excluding water therefrom so that a separate float or extraneous container is rendered unnecessary, the exterior surface of the sides and bottom of the candle body being maintained in their initial condition.

THOMAS J. MUENCH.